CARBURIZING METHOD AND APPARATUS

Original Filed Aug. 20, 1965 4 Sheets-Sheet 1

INVENTOR:
ORVILLE E. CULLEN.
BY
ATT'YS.

CARBURIZING METHOD AND APPARATUS

Original Filed Aug. 20, 1965 4 Sheets-Sheet 2

INVENTOR:
ORVILLE E. CULLEN.
BY
Owen & Owen
ATT'YS.

CARBURIZING METHOD AND APPARATUS

Original Filed Aug. 20, 1965 4 Sheets-Sheet 3

INVENTOR:
ORVILLE E. CULLEN.
BY
ATT'YS.

CARBURIZING METHOD AND APPARATUS

Original Filed Aug. 20, 1965 4 Sheets-Sheet 4

INVENTOR:
ORVILLE E. CULLEN.
BY
ATT'YS.

United States Patent Office

Re. 26,935
Reissued Aug. 18, 1970

26,935

CARBURIZING METHOD AND APPARATUS

Orville E. Cullen, Toledo, Ohio, assignor to Midland-Ross Corporation, Toledo, Ohio, a corporation of Ohio Original No. 3,356,541, dated Dec. 5, 1967, Ser. No. 481,199, Aug. 20, 1965. Application for reissue June 26, 1968, Ser. No. 787,283
Int. Cl. C23c *11/12*
U.S. Cl. 148—16.5 24 Claims

Matter enclosed in heavy brackets [ ] appears in the original patent but forms no part of this reissue specification; matter printed in italics indicates the additions made by reissue.

ABSTRACT OF THE DISCLOSURE

The present invention relates to a continuous method for carburizing ferrous metal work. The work is passed successively through longitudinally extending and aligned heating, carburizing and diffusing zones. In one embodiment of the invention a high carbon potential is maintained in the carburizing zone and a lower carbon potential is maintained in the diffusing zone. The carbon potential of the carburizing and of the diffusing zones is controlled by introducing into the heating zone a carrier gas incapable of appreciable carburization of the work. Appreciable flow of the carrier gas is prevented except in the direction of work movement through the heating zone. A mixture of a carrier gas an an enriching gas, in proportions to provide the carbon potential desired in the diffusing zone, is introduced into the diffusing zone at a rate sufficient to cause a flow of the gas mixture toward the carburizing zone in a direction opposed to the work travel. Atmosphere is withdrawn from the carburizing zone at a rate which is substantially the sum of the rate at which the carrier gas is introduced into the heating zone and the rate at which the mixture of the carrier gas and the enriching gas is caused to flow toward the carburizing zone from the diffusing zone. An enriching gas is introduced in the carburizing zone and mixed with the atmosphere therein to provide the desired carbon potential in the carburizing zone. Substantially uniform and separtae recirculation of the atmospheres within the carburizing and diffusing zones is effected from a first to an opposed boundary of the zones and exteriorly of the zones back to the first boundary. Concurrently, atmosphere from the carburizing zone is prevented from flowing to either the heating zone or the diffusing zone.

This invention relates to a continuous method for carburizing ferrous metal work.

In the art of carburizing it is known to use gaseous atmospheres to achieve carburization of ferrous metal work. U.S. Pat. 2,955,062 discloses a method for carburizing in a continuous furnace *having a carburizing zone, a diffusing zone, and a means for controlling the furnace temperature to provide, within the carburizing zone, a carburizing region having a substantially constant temperature within the austenitic range of the work, and a temperature within the austenitic range of the work in a least a portion of the diffusing zone.* [wherein the] *The* work passes through a carburizing zone *having an atmosphere* of a high carbon potential and then through a diffusion zone having *an atmosphere with* a lower carbon potential. The high carbon potential in the carburizing zone enables the introduction into the work, in a reasonable carburizing time, of an amount of carbon sufficient to provide a required case depth, while the lower carbon potential in the diffusion zone provides a desirable carbon content adjacent the surface of the work. *For conventional carburization, the carbon potential of the carburizing gas is usually within the range of from 0.60 to 1.40 percent.* If carburization were continued at the high carbon potential of the carburizing zone, a carbon distribution generally as represented by FIG. 6 of the indicated patent, curve 1, would be the result. By virtue of the lowered carbon potential in the diffusion zone a carbon distribution generally as represented in FIG. 6, curve 2, is achieved.

It has been found that the prior art method disclosed in U.S. Pat. 2,955,062 is very difficult to control. Present day specifications not only specify the total case depth, which is established as a primary function of time and temperature, but also the specifications further specify the character of the carburized case with respect to surface carbon, preferred slope of the carbon gradient, and the depth of effective case measured to a desired carbon level or to a specified Rockwell hardness, all of which are highly dependent upon the carbon potential of the surrounding atmosphere.

It has been found that where undesired spillover occurs between the atmospheres of adjacent zones it is extremely difficult to consistently meet present day specifications.

It is the primary object of the instant invention to provide an improved method and apparatus for carburizing in a continuous furnace.

It is a still further object of the instant invention to provide an improved method and apparatus for carburizing ferrous metal work whereby the work is case hardened accurately with respect to surface carbon, slope of carbon gradient curve and depth of effective case.

It is still another object of the instant invention to provide an improved method for carburizing ferrous metal work wherein a high degree of control is achieved and wherein the work is processed in a shortened period of time.

Further objects of this invention will become apparent from the following specification and drawings in which.

Figure 1:
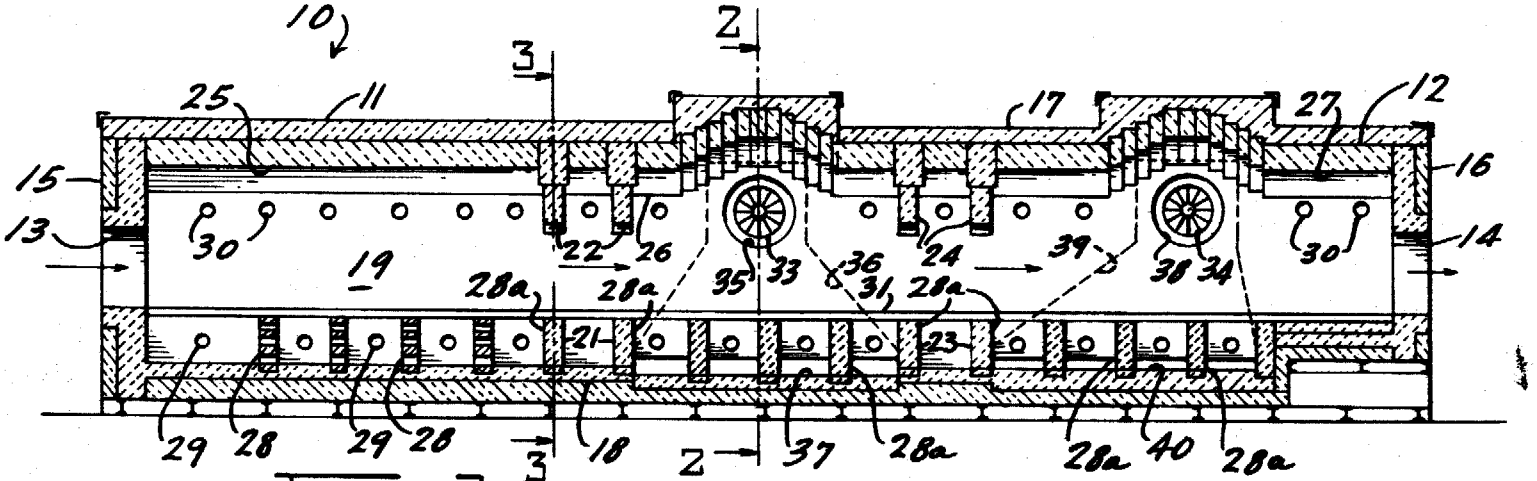
FIG. 1 is a vertical sectional view in elevation, with parts removed for clarity, showing a continuous furnace used in practicing the present invention.

Briefly, the present invention relates to a continuous method for carburizing ferrous metal work. The work is passed successively through longitudinally extending and aligned heating, carburizing, and diffusing zones. In one embodiment of the invention a high carbon potential is maintained in the carburizing zone and a lower carbon potential is maintained in the diffusing zone. The carbon potential of the carburizing and of the diffusing zones is controlled by introducing into the heating zone a carrier gas incapable of appreciable carburization of the work. Appreciable flow of the carrier gas is prevented except in the direction of work movement through the heating zone. A mixture of a carrier gas and an enriching gas, in proportions to provide the carbon potential desired in the diffusing zone, is introduced into the diffusing zone at a rate sufficient to cause a flow of the gas mixture toward the carburizing zone in a direction opposed to the work travel. Atmosphere is withdrawn from the carburizing zone at a rate which is substantially the sum of the rate at which the carrier gas is introduced into the heating zone and the rate at which the mixture of the carrier gas and the enriching gas is caused to flow toward the carburizing zone from the diffusing zone. An enriching gas is introduced in the carburizing zone and mixed with the atmosphere therein to provide the desired carbon potential in the carburizing zone. Substantially uniform and separate recirculation of the atmospheres within the carburizing and diffusing zones is effected from a first to an opposed boundary of the zones and exteriorly of the zones back to the first boundary. Concurrently, atmosphere from the carburizing zone is prevented from flowing to either the heating zone or the diffusing zone.

In another embodiment, according to the present invention a carrier gas incapable of appreciable carburization of the work is introduced into the heating zone. Appreciable flow of the carrier gas is prevented except in the direction of work movement through the heating zone. An enriching gas is introduced in the carburizing zone to provide the desired carbon potential in the [diffusing] *carburizing* zone. Atmosphere is withdrawn from the diffusing zone at a rate sufficient to cause a flow of atmosphere from the carburizing zone. An oridizing gas is introduced in the diffusion zone and mixed with the atmosphere therein to provide the desired carbon potential in the [carburizing] *diffusing* zone. Atmosphere is withdrawn from the diffusing zone at substantially the rate at which atmosphere is introduced into the several zones *to cause a flow of atmosphere from the heating and carburizing zones towards the diffusion zone.*

Carbon potential of a fluid, as used herein and in the appended claims, indicates the carbon content to which that gas will carburize steel if equilibrium is reached. It is customarily measured in percent of carbon in thin strips of steel which have been brought to substantial equilibrium with the gaseous atmosphere and have a substantially uniform carbon content throughout the strip.

Carbon potential is also a function of temperature. At least within the austenitic range the carbon potential of a gas of a given composition increases with decreases in temperature. Known gases having a carbon potential within the range usually required for conventional carburization, namely, 0.60 to 1.40 percent, at normal carburizing temperatures, decompose badly and deposit large quantities of soot at lower temperatures. Lower decomposition temperatures are present within the temperature range to which work is subjected during the initial heating step and often during a cooling step. Therefore, it is important that the high carbon potential atmosphere of the carburizing zone does not flow out of the carburizing zone into the adjacent heating zone which has regions which are at decomposing temperatures, but such flow to the diffusing zone is not necessarily harmful.

The term "enriching gas," as used herein, means a $CH_4$ gas, which term includes natural gas, relatively pure methane, ethane, propane, and other hydrocarbons and oxyhydrocarbons that are methane equivalents in that they are known enriching gases for carburizing.

The term "carrier gas," as used herein, refers to a gas having the following volume composition: 12 to 25% CO, 15 to 50% $H_2$, traces of $CH_4$, $H_2O$, and $CO_2$, and the balance of at least 20% $N_2$. Preferably, a typical carrier gas which could be enriched with methane comprises, for example:

| | Percent by volume |
|---|---|
| $CO_2$ | Trace |
| CO | 20.7 |
| $H_2$ | 38.7 |
| $CH_4$ | 0.8 |
| $H_2O$ | [1] Trace |
| $N_2$ | Balance |

[1] Dew point 20° F.

The term "oxidizing gas," as used herein, refers to a gas such as air, $H_2O$, or $CO_2$ and also includes one or more of these gases mixed with a substantially neutral gas, e.g. a carrier gas.

Referring to FIG. 1 of the drawings, a heat treating furnace is generally indicated at 10. The furnace 10 comprises a metallic casing or shell 11 which encloses a refractory structure 12. An inlet opening 13 and a discharge opening 14 are located at opposed ends 15 and 16 of the furnace 10. The openings 13 and 14 are in communication with vestibules (not shown) having doors which are electrically interlocked, as is well known in the art, to prevent loss of the respective furnace atmospheres.

Figure 3:
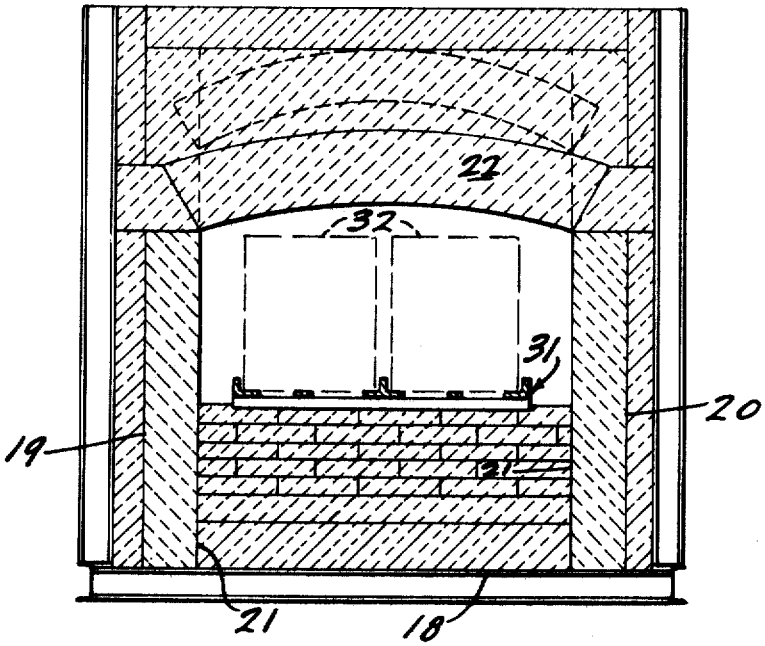
FIG. 3 is a vertical sectional view, shown on an enlarged scale, and taken along the line 3—3 of FIG. 1.

In addition to the ends 15 and 16, the furnace 10 has a top 17, a bottom 18 and opposed side walls 19 and 20. Pairs of solid piers 21 (FIG. 3) extend upwardly from the bottom 18 at a location spaced longitudinally from the end 15 of the furnace 10 and support a pair of arches 22. Similarly, pairs of piers 23 are spaced from the opposite end 16 of the furnace 10 and support arches 24.

The end wall 15, the top wall 17, the bottom wall 18, the side walls 19 and 20, and the pair of arches 22 define a heating zone 25 of the furnace 10. The arches 22, the arches 24, the top wall 17, the bottom wall 18, and the side walls 19 and 20, define a carburizing zone 26 of the furnace 10. Similarly, the arches 24, the end wall 16, the top wall 17, the bottom 18, and the side walls 19 and 20 define a diffusing zone 27 of the furnace 10.

It should be expressly understood that other heat treatment operations may be performed upon the work before it enters the heating zone 25 and subsequent to its discharge from the diffusing zone 27. For example, a quench operation subsequent to the discharge from the diffusing zone 27 is common, and the present invention is not limited by preliminary operations or subsequent operations, but is directed to a method of carburizing which may be but one operation in the treatment of ferrous work. A plurality of intermediate walls 28 and 28a extend transversely between the side walls 19 and 20 and also extend upwardly from the bottom 18 of the furnace 10. Preferably, lower radiant tubes 29 are positioned between adjacent intermediate walls 28 and 28a and serve as heating means. The intermediate walls 28 are of checkered construction, and are in the heating zone, while the walls 28a between the respective pairs of piers 21 and 23 in the carburizing and diffusing zones are solid. The walls 28a are effective to prevent atmosphere movement between the respective furnace zones. The lower radiant tubes 29 may be either gas fired or electrical radiant tubes and preferably are either individually or zone controlled with respect to their temperatures. Similarly, upper radiant tubes 30 are longitudinally spaced adjacent the top 17 of the furnace 10.

Conveyor means 31 are supported by the intermediate walls 28 and 28a, and by the respective end walls 15 and 16. The conveyor means 31 may be of any of the well known types, for example, a series of transversely extending rollers or in the alternative longitudinally extending tracks. The conveyor means 31 support a plurality of work pallets, indicated at 32 in FIGS. 2 and 3. Ferrous work to be treated, for example gears, is placed on the pallets 32 which are moved along the conveyor means 31. The conveyor means 31 includes driving means, for example, a chain conveyor or a pusher (not shown), suitable for moving the pallets 32 through the furnace 10 in a conventional manner.

Recirculating means are provided both in the carburizing zone 26 and in the diffusing zone 27. In the instant embodiment, the recirculating means comprises side fans 33 and 34 which are mounted adjacent the side wall 19 of the furnace 10 in the carburizing zone 26 and in the diffusing zone 27, respectively.

The recirculating rates within the carburizing zone 26 and the diffusing zone 27 are an important feature of the present invention. It has been found that the recirculating rates should preferably be at least 50 times the rate of the atmosphere entering the furnace 10.

The high recirculating rates, insure a quick recovery of the desired zone atmospheres if they are lost during furnace operation. It has been found that atmosphere recovery takes only a matter of minutes compared to prior art recovery rates which were often extremely lengthy.

Figure 2:
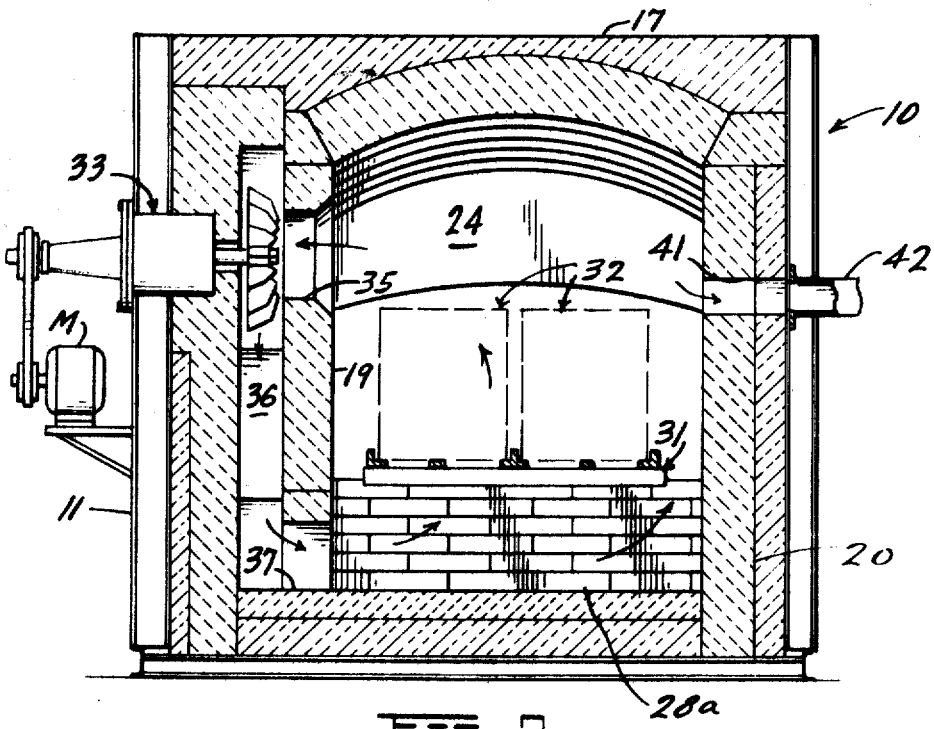
FIG. 2 is a vertical sectional view shown on an enlarged scale, and taken along the line 2—2 of FIG. 1.

Referring to FIG. 2, the side fan 33 is driven by a motor which is mounted adjacent the shell 11 of the furnace 10. The side wall 19 of the furnace 10 defines an intake opening 35 which communicates with a recirculating passageway 36. The recirculating passageway 36 is defined by spaced portions of the side wall 19 and is generally vertical. The side wall 19 also defines discharge openings 37 near the bottom 18 which communicate with the recirculating passageway 36 and the intake opening 35. Preferably, the side fan 33 withdraws atmosphere at a given rate from the carburizing zone 26 through the intake opening 35 downwardly through the recirculating passageway 36 and discharges the recirculated fluid through the discharge openings 37 at a position below the conveyor means 31. It has been found that recirculating fluid in this manner produces a plenum effect in the area below the conveyor means 31. It has also been found that this plenum effect is extremely useful in the controlling of the carburizing atmosphere within the carburizing zone 26. The results achieved by utilizing this plenum effect are far superior to the effects achieved by merely recirculating with, for example, overhead fans.

In like manner, the side wall 19 has an intake opening 38 adjacent the side fan 34 located in the diffusing zone 27. The opening 38 communicates with a generally vertical recirculating pasageway 39 (indicated by dashed lines in FIG. 1) and discharge openings 40 are located in the wall 19 near the bottom 18.

An effluent opening 41 (see FIG. 2) is provided in the side wall 20 of the furnace 10. The effluent opening 41 is in communication with the carburizing zone 26 and atmosphere is withdrawn from the carburizing zone 26, for example, through an orifice (not illustrated).

In a typical work carburizing operation, according to the first embodiment of the present invention, work is placed on the trays or pallets 32 and is introduced into the heating zone 25 through the inlet opening 13. The work then passes successively through the longitudinally extending heating zone 25, the carburizing zone 26, and the diffusing zone 27, and outwardly through the discharge opening 14 of the furnace 10.

As the metal work passes through the heating zone 25 its temperature is raised from its entrance temperature to a carburizing temperature of between 1350° F. to 1800° F. Normally, the carburizing temperature is approximately 1700° F. The carbon content of the ferrous metal work to be carburized normally falls between 0.10% and 0.60%, when it is introduced into the heating zone 25. A carrier gas, of the composition described above, is introduced into the heating zone by suitably piping (not shown) at a predetermined rate. The carrier gas may have an appreciable carbon potential, but is incapable of appreciable carburization of the ferrous metal work. If the carbon potential of the carrier gas is too high or if the atmosphere of the carburizing zone 26 flows into the heating zone 25, there is a tendency to deposit large amounts of soot at the relatively low temperature regions of the heating zone.

After the ferrous metal work is heated to its proper carburizing temperature, it passes into the carburizing zone 26. An enriching gas is introduced into the carburizing zone 26 through suitable piping (not shown) at a sufficient rate to insure a high carbon potential atmosphere in the carburizing zone 26. The carbon potential of the carburizing zone atmosphere *at the carburizing temperature* is normally held at between 1.0[%] *percent* and 1.4[%] *percent, but it may be held anywhere within the aforementioned conventional range of between 0.6 and 1.4 percent.*

The ferrous metal work then passes through the carburizing zone into the diffusing zone 27. A mixture of a carrier gas and an enriching gas in proportions to provide the predetermined carbon potential desired in the diffusing zone atmosphere is introduced into the diffusing zone 27 through suitable piping (not shown).

An important feature of the present embodiment of the method is that a portion of the carburizing zone atmoshpere is withdrawn through the effluent opening 41 to draw atmosphere from the heating zone 25 and diffusing zone 27 into the carburizing zone 26. Such atmosphere flow, in cooperation with the vigorous atmosphere circulation, as discussed above, effectively prevents reverse flow, or flow from the carburizing zone 26 into the heating zone 25 or into the diffusing zone 27. The discharge of atmosphere from the carburizing zone 26, through the effluent piping 42, is at a rate which is substantially the sum of the rates at which atmosphere is introduced into the several zones of the furnace.

It has been found that the present method gives consistent and reproducible results in the carburizing of ferrous metal work. Superior results are achieved by the accurate controlling of the atmospheres in the various zones and by the elimination of atmosphere flow from the carburizing zone 26 into the adjacent zones 25 and 27.

Figure 5:
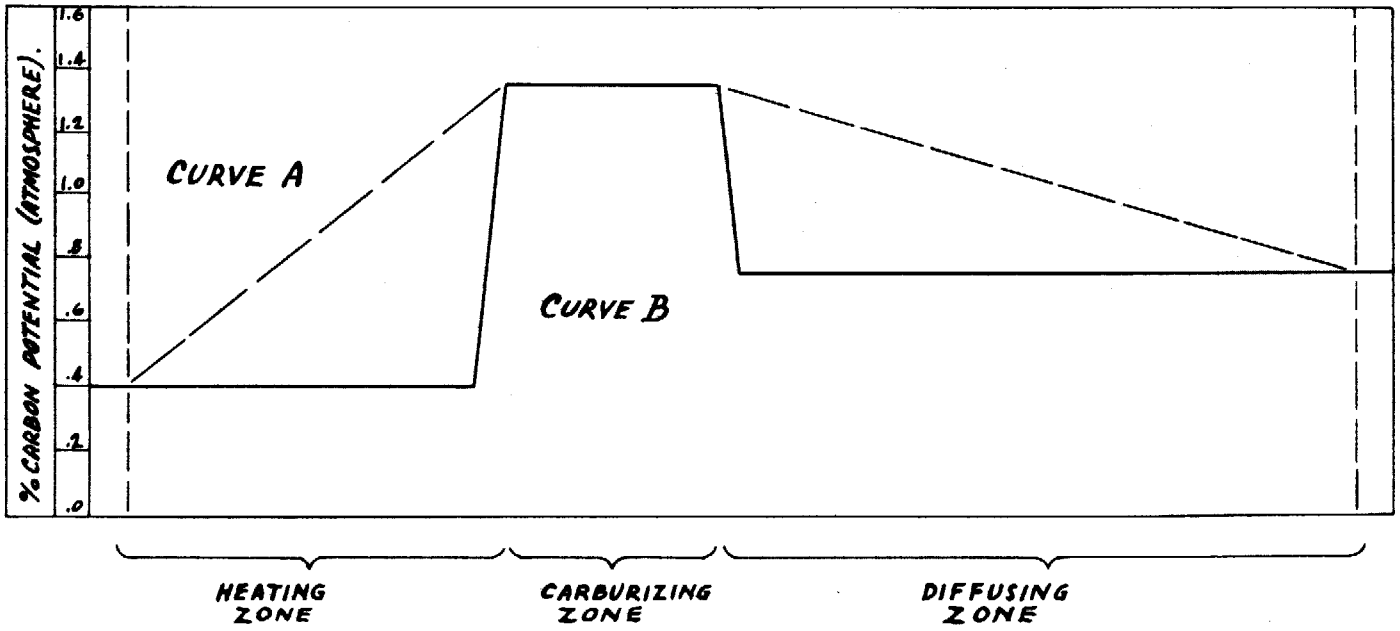
FIG. 5 is a graph showing atmosphere carbon potential throughout the furnace of FIG. 1 while practicing one embodiment of the present invention and also showing atmosphere carbon potential of a prior art method.

FIG. 5 is a graph showing atmosphere carbon potential in relationship to various longitudinal locations within the various furnace zones 25, 26, and 27 *and is used for comparative purposes to show the difference between the carbon potentials of these zones when the present methods and apparatuses are used for a specific example as opposed to the use of the prior art method for a similar example.* It should be noted that curves A and B are both ideal curves. Curve A represents the atmosphere carbon potential through the furnace when practicing the method disclosed in U.S. Pat. 2,955,062 and curve B represents the atmosphere carbon potential through the furnace when practicing the present method.

In the prior art method disclosed in U.S. Pat. 2,955,062, a major portion of the total furnace atmosphere was introduced into the carburizing zone and a gentle atmosphere flow was maintained from the carburizing zone into the adjacent zones. Ideally, a dynamic equilibrium would be established within the furnace, by chemical reaction between the work and the atmosphere in the heating zone and by controlled addition of an oxidizing gas to the diffusing zone. In practice, the dynamic equilibrium was difficult to achieve at all, and impossible to maintain. For example, flow of atmosphere to the heating zone at a rate greater than that instantaneously required for equilibrium would cause excessive "sooting," and any change in the rate of flow of atmosphere to the heating zone would necessitate a compensating change in the rate at which atmosphere was introduced into the carburizing zone, the diffusing zone, or both.

Similarly, in the prior art method, the carbon potential of the diffusing zone atmosphere decreased gradually from a high point which corresponded to the carbon potential of the carburizing zone atmosphere to a low carbon potential, which was the desired final carbon content of the surface of the ferrous metal work which was being carburized. Finally, because the method depended upon establishing a dynamic equilibrium with slow moving gases, a long period of time was required to reestablish the equilibrium after any disruption thereof, for example, by excessive opening of the furnace door in a given period of time.

Under the method of the present invention, the carbon potentials of the atmoshperes in the heating zone 25 and the diffusing zone 27 remain substantially on a horizontal path throughout the lengths of the respective zones. Several advantages are achieved because of the unique carbon potential curve B achieved by the present method, as illustrated in FIG. 5. First, the carbon potentials of the atmospheres in the respective zones can be controlled closely. All three of the zones can be regulated independently because of the unidirectional flow of atmosphere between adjoining zones. Therefore, the carbon potentials of the heating zone atmosphere and of the diffusing zone atmosphere may be readily observed and adjusted, if necessary. Under the present method it is possible to carburize ferrous metal work in strict accordance with a set of rigid specifications. In other words, surface case depth, the length and slope of the carbon gradient, and the total case depth may be very accurately controlled by using the present method of carburizing.

Another advantage is that time savings of between 10% and 25% are achieved when using the instant method. The time savings result from the accurate atmosphere control which is illustrated by curve B in FIG. 5, as distinguished from curve A.

As the ferrous metal work passes longitudinally through the respective zones, the atmospheres are recirculated within the carburizing zone 26 and within the diffusing zone 27. Referring to FIGS. 1 and 2, in the carburizing zone 27 recirculated fluid is discharged through the discharge openings 37 beneath the conveyor means 31. As was previously mentioned, the conveyor means 31 and the work pallets 32 tend to partially restrict the upward flow of fluid and a plenum effect results. The fluid rises in the carburizing zone 26 from a first boundary of the zone, which is adjacent the bottom 18, upwardly, and uniformly contacts the ferrous metal work which is being carried by the pallets 32. The carburizing fluid continues upwardly until it reaches an opposed boundary of the carburizing zone 26 which is adjacent the top 17 of the furnance 10. A portion of the fluid is dispelled outwardly at a predetermined rate, as described above, through the effluent opening 41 and through the effluent piping 42. The remainder of the fluid passes through the intake opening 35, downwardly through the recirculating passageway 36 which is located exteriorly of the carburizing zone 26 and is recirculated through the discharge openings 37.

The atmosphere within the diffusing zone 27 recirculates in a similar manner. However, a predetermined portion of the diffusing zone atmosphere is caused to flow toward and into the carburizing zone. The remainder of the fluid is recirculated through the recirculating passageway 39 (see FIG. 1). It should be noted that while the apparatus disclosed above provides recirculation along a path within the zones 26 and 27 from a bottom boundary to a top boundary, other apparatus which establishes, for example, a transverse path may be used in practicing the present method.

Figure 6:
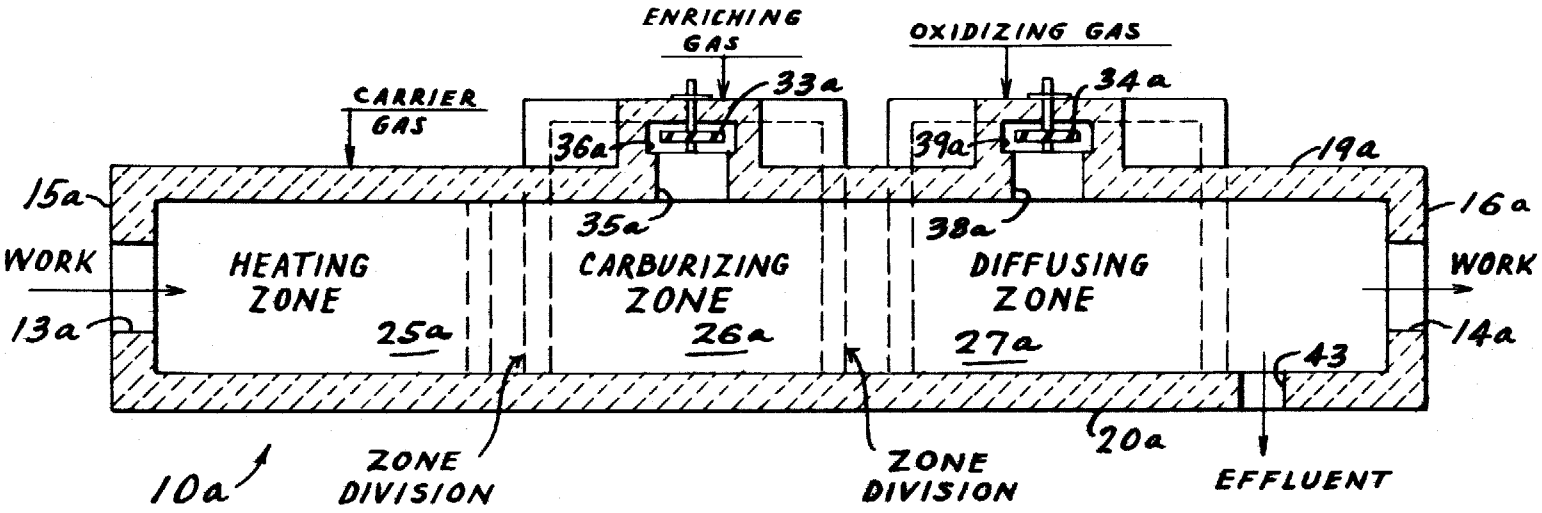
FIG. 6 is a diagrammatic view, similar to FIG. 4 and illustrating another embodiment of the present invention.

A second embodiment of the present invention is shown in FIG. 6.

In this embodiment, an effluent opening 43 is provided in the side wall 20a of the furnace 10a. The effluent opening 43 is in communication with the diffusing zone 27a.

A carrier gas, of the composition described, is introduced into the heating zone 25a.

An enriching gas is introduced into the carburizing zone 26a at a sufficient rate to insure a high carbon potential atmosphere in the carburizing zone 26a. However, in this embodiment a portion of the atmosphere of the diffusing zone 27a is withdraw through the effluent opening 43 whereby atmosphere flows into the diffusing zone 27a from the carburizing zone 26a.

In this embodiment reverse flow from the carburizing zone 26a to the heating zone 25a and from the diffusing zone 27a to the carburizing zone 26a is prevented. Rather, a controlled flow in the direction of work travel is induced.

An oxidizing gas in introduced into the diffusing zone 27a to maintain in the diffusing zone an atmosphere having a composition substantially different [than] *from* that of the atmosphere in the carburizing zone.

In general, the embodiment of the invention illustrated in FIG. 6 is preferred when it is desired to operate the diffusing zone at a temperature substantially lower than that of the carburizing zone, for example, to prevent distortion of the carburized work during a subsequent quenching operation. For example, the carburizing zone may be operated at a temperature of about 1700° F. while the diffusing zone is operated at a temperature of about 1550° F., and it might be desired to maintain the atmosphere of the carburizing zone at a carbon potential of about 1.05 *percent* and the atmosphere of the diffusing zone at a carbon potential of 0.90 *percent*. Appropriate atmospheres derived from a carrier gas produced from methane and enriched with methane would have the following approximate compositions.

| | Carburizing zone | Diffusing zone |
|---|---|---|
| $CO_2$ | 0.08 | 0.30 |
| CO | 19.2 | 20.5 |
| $H_2$ | 40.4 | 39.2 |
| $CH_4$ | 1.6 | 1.0 |
| $N_2$ | Balance | Balance |
| Dew point (° F.) | 10 | 28 |

If the carrier gas were produced from ethane or propane and enriched with methane there would be a relatively minor shift in the carbon monoxide and hydrogen contents of the atmospheres, but the critical and substantial difference in carbon dioxide content and dew point would be substantially the same.

Figure 4:
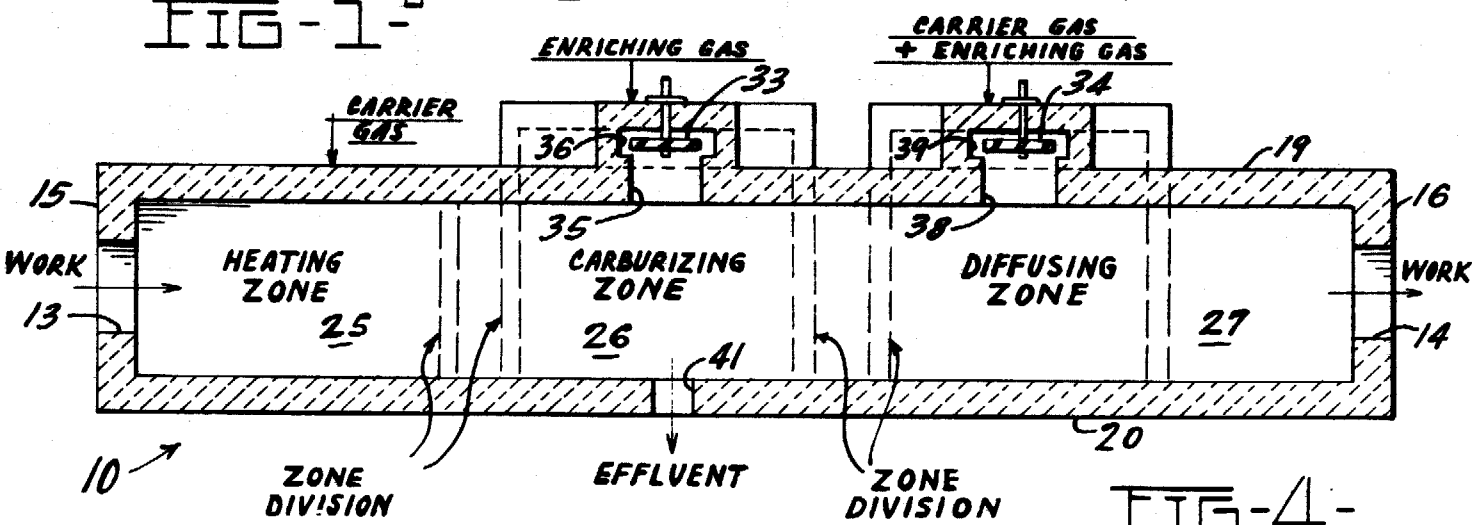
FIG. 4 is a diagrammatic plan view, partially shown in section, of the furnace of FIG. 1.

The embodiment of the invention shown in FIG. 4 is usually preferred where a greater carbon potential differential is desired between the carburizing zone and the diffusing zone atmospheres. In such cases the two zones are usually operated at approximately the same temperature, for example, about 1700° F. In a specific instance it may be desired to maintain the atmosphere in the carburizing zone at a carbon potential of 1.20 *percent* and the atmosphere of the diffusing zone at a carbon potential of 0.90 *percent*. Using a carrier gas derived from methane and methane as an enriching gas, the following atmospheres would be appropriate.

| | Carburizing zone | Diffusing zone |
|---|---|---|
| $CO_2$ | 0.065 | 0.095 |
| CO | 18.5 | 19.8 |
| $H_2$ | 41.5 | 40.2 |
| $CH_4$ | 2.2 | 0.8 |
| $N_2$ | Balance | Balance |
| Dew point (° F.) | 7 | 14 |

Again, if a carrier gas derived from a different hydrocarbon were used, if a different enriching gas were used, or if both a carrier gas derived from a different hydrocarbon and a different enriching gas were used there would be corresponding changes in composition, but there would still be the same critical and substantial differences *which serve to produce a specific carbon potential at a given temperature, namely, the differences* in carbon dioxide content, hydrocarbon content and dew point.

While the present invention has been disclosed in connection with a specific arrangement of parts, it is to be expressly understood that numerous modifications and changes may be made without departing from the scope of the appended claims.

I claim:

1. In a continuous method for carburizing ferrous metal work which includes the steps of passing the work successively through longitudinally extending and aligned heating, carburizing, and diffusing zones while maintaining a temperature between 1350° F. and 1800° F. in each of the zones, the improvement of controlling the carbon potential of the carburizing zone between 0.6 and 1.4 percent and [diffusing zone between 0.6 and 1.1 percent] *of the diffusing zone at a lower carbon potential* by causing atmosphere flow in one direction while preventing such flow in the opposite direction between the two, introducing into the heating zone a carrier gas incapable of appreciable carburization of the work, preventing appreciable flow of the carrier gas except in the direction of work movement through the heating zone and into the curburizing zone, mixing with the atmosphere which flows into the carburizing zone from at least one of the other zones an enriching gas in a proportion to provide the carbon potential desired therein, preventing appreciable flow of atmosphere from the carburizing zone to the heating zone, introducing into the diffusing zone an atmosphere which, when mixed with any atmosphere flowing into the diffusing zone from the carburizing zone, provides the atmosphere required therein, and withdrawing atmosphere from the one of the carburizing and diffusing zones toward which atmosphere flows from the other at substantially the rate at which atmosphere is introduced into the several zones.

2. In a continuous method for carburizing ferrous metal work which includes the steps of passing the work successively through longitudinally extending and aligned heating, carburizing, and diffusing zones while maintaining a temperature between 1350° F. and 1800° F. and a [high] carbon potential in the carburizing zone *of between 0.6 and 1.4 percent* and similar temperature range but a lower carbon potential in the diffusing zone, the improvement of controlling the carbon potential of the carburizing zone between 0.6 to 1.4 percent and of the diffusing zone [between 0.6 to 1.1 percent] by introducing into the heating zone a carrier gas incapable of appreciable carburization of the work, preventing appreciable flow of the carrier gas except in the direction of work movement through the heating zone, introducing into the diffusing zone a mixture of a carrier gas and an enriching gas in proportions to provide the carbon potential desired in the diffusing zone, and at a rate sufficient to cause a flow of the gas mixture toward the carburizing zone, withdrawing atmosphere from the carburizing zone at a rate which is substantially the sum of the rate at which the carrier gas is introduced into the heating zone and the rate at which the mixture of the carrier gas an of the enriching gas is caused to flow toward the carburizing zone, mixing with the atmosphere in the carburizing zone an enriching gas in a proportion to provide the carbon potential desired therein, and preventing appreciable flow of atmosphere from the carburizing zone to either of the heating and diffusing zones.

3. In a continuous method for carburizing ferrous metal work which includes the steps of passing the work successively through longitudinally extending and aligned heating, carburizing, and diffusing zones while maintaining a temperature between 1350° F. and 1800° F. and a carbon potential between 0.6 and 1.4 percent in the carburizing zone and a similar temperature range but a lower carbon potential in the diffusing zone, the improvement of controlling the carbon potential of the carburizing and of the diffusing zones by introducing into the heating zone a carrier gas incapable of appreciable carburization of the work, maintaining the heating zone at a temperature approximately the temperature of the carburizing zone, preventing appreciable flow of the carrier gas except in the direction of work movement through the heating zone, and into the carburizing zone, introducing into the diffusing zone a mixture of a carrier gas and an enriching gas in proportions to provide the carbon potential desired in the diffusing zone, and at a rate sufficient to cause a flow of the gas mixture toward the carburizing zone, withdrawing atmosphere from the carburizing zone at a rate which is substantially the sum of the rate at which the carrier gas is introduced into the heating zone and the rate at which the mixture of the carrier gas and of the enriching gas is caused to flow toward the carburizing zone to induce a flow of atmosphere thereto from the heating and diffusing zones, mixing with the atmosphere in the carburizing zone an enriching gas in a proportion to provide the carbon potential desired therein, and preventing appreciable flow of atmosphere from the carburizing zone to either of the heating and diffusing zones by circulating atmosphere at a high rate, relative to the rate at which atmosphere is supplied to the several zones in a direction which has substantially no component longitudinal of the zones from a first boundary to an opposed boundary of each of the carburizing and diffusing zones, and from each opposed boundary, exteriorly of the zone, back to the respective first boundary.

4. The improvement as claimed in claim 3 wherein the rates of atmosphere circulation of atmosphere within the carburizing and diffusing zones are at least about 50 times the rate at which atmosphere is supplied to the several zones.

5. The improvement as claimed in claim 4 wherein the circulation of atmosphere within the carburizing and diffusing zones is from plenums adjacent the first boundaries thereof, through the zones and back to the plenums.

6. The improvement as claimed in claim 5 wherein the plenums are immediately below the respective zones.

7. In a continuous method for carburizing ferrous metal work which includes the steps of passing the work successively through longitudinally extending and aligned heating, carburizing, and diffusing zones while maintaining a temperature between 1350° F. and 1800° F. in each of the zones, the improvement of controlling the carbon potential of the carburizing zone between 0.6 to 1.4 percent and of the diffusing zone [betwen 0.6 and 1.1 percent] *at a lower carbon potential* by introducing into the heating zone a carrier gas incapable of appreciable carburization of the work, preventing appreciable flow of the carrier gas except in the direction of work movement through the heating zone and into the carburizing zone, introducing into the carburizing zone a mixture of a carrier gas and an enriching gas in proportions to establish and maintain the carbon potential desired in the carburizing zone, withdrawing atmosphere from the diffusing zone at a rate sufficient to induce a flow of atmosphere from the carburizing zone toward the diffusing zone, mixing with the atmosphere in the diffusing zone an oxidizing gas and any carrier gas that may be required in proportions to provide the carbon potential desired therein, and preventing appreciable flow of atmosphere from the carburizing zone to the heating zone and from the diffusing zone to the carburizing zone by circulating atmosphere at a high rate, relative to the rate at which atmosphere is supplied to the several zones, in a direction which has substantially no component longitudinal of the zones from a first boundary to an opposed boundary of each of the carburizing and diffusing zones, and from each opposed boundary, exteriorly of the zone, back to the respective first boundary.

8. The improvement as claimed in claim 7 wherein the rates of atmosphere circulation of atmosphere within the carburizing and diffusing zones are at least about 50 times the rate at which atmosphere is supplied to the several zones.

9. The improvement as claimed in claim 8 wherein the circulation of atmosphere within the carburizing and diffusing zones is from plenums adjacent the first boundaries thereof, through the zones and back to the plenums.

10. The improvement as claimed in claim 9 wherein the plenums are immediately below the respective zones.

11. In a continuous method for carburizing ferrous metal work, the steps comprising: introducing the work into a heating zone [at] *having* a temperature between 1350° F. and 1800° F., providing the heating zone with a first gas, allowing the work to attain a temperature between 1350° F. and 1800° F., passing the work into a carburizing zone [at] *having* a temperature between 1350° F. and 1800° F., preventing appreciable flow of the first gas except in the direction of work movement through the heating zone and into the carburizing zone, mixing the first gas which flows into the carburizing zone with a second gas, the composition of the gases being such that the resulting mixture has a carbon potential between 0.6 and 1.4 percent, preventing appreciable flow of atmosphere from the carburizing zone to the heating zone, [allowing the work to remain within the carburizing zone until the work achieves a carbon potential between 0.6 and 1.4 percent,] conveying the work into a diffusing zone, introducing into the diffusing zone an atmosphere which has a carbon potential of less than the mixture in the carburizing zone, preventing appreciable flow of the diffusing atmosphere except in a direction opposed to work movement, and withdrawing atmosphere from the carburizing zone at a rate at which atmosphere is introduced into the several zones.

12. The method of claim 11 including the step of circulating atmosphere at a high rate, relative to the rate at which atmosphere is supplied to said several zones, in a direction which has substantially no component longitudinal of said furnace from a first boundary to an opposed boundary of each of the carburizing and diffusing zones, and from each opposed boundary, exteriorly of said zone, back to the respective first boundary.

13. In a continuous method for carburizing ferrous metal work, the steps comprising: introducing the work into a heating zone [at] *having* a temperature between 1350° F. and 1800° F., providing the heating zone with a first gas, allowing the work to attain a temperature between 1350° F. and 1800° F., passing the work into a carburizing zone [at] *having* a temperature between 1350° F. and 1800° F., preventing appreciable flow of the first gas except in the direction of work movement through the heating zone and into the carburizing zone, mixing the first gas which flows into the carburizing zone with a second gas, the composition of the gases being such that the resulting mixture has a carbon potential between 0.6 and 1.4 percent, preventing appreciable flow of atmosphere from the carburizing zone to the heating zone, [allowing the work to remain within the carburizing zone until the work achieves a carbon potential between 0.6 and 1.4 percent,] conveying the work into a diffusing zone, allowing a portion of the carburizing atmosphere to flow into the diffusing zone, introducing into the diffusing zone a third gas which, when mixed with any atmosphere flowing into the diffusing zone from the carburizing zone, provides an atmosphere having a carbon potential of less than 1.1 percent, and withdrawing atmosphere from the diffusing zone at a rate at which atmosphere is introduced into the several zones.

14. The method of claim 13 including the step of circulating atmosphere at a high rate, relative to the rate at which atmosphere is supplied to said several zones, in a direction which has substantially no component longitudinal of said furnace from a first boundary to an opposed boundary of each of the carburizing and diffusing zones, and from each opposed boundary, exteriorly of said zone, back to the respective first boundary.

15. Apparatus for continuously carburizing ferrous metal work comprising: a furnace including longitudinally extending and aligned heating, carburizing, and diffusing zones, means for conveying work successively through said zones, means for heating work within said zones, means for introducing into said heating zone a carrier gas incapable of appreciable carburization of the work, means for introducing into said carburizing zone a mixture of a carrier gas and an enriching gas in proportions to establish and maintain the carbon potential between 0.6 to 1.4 percent in the carburizing zone, means for withdrawing atmosphere from said diffusing zone at a rate sufficient to induce a flow of atmosphere from said heating zone toward said carburizing zone and from said carburizing zone toward said diffusing zone, means for mixing with the atmosphere in said diffusing zone an oxidizing gas and any carrier gas that may be required in proportions to provide a carbon potential between 0.6 and 1.1 percent therein, and means for preventing appreciable flow of atmosphere from said carburizing zone to said heating zone and from said diffusing zone to said carburizing zone.

16. The apparatus of claim 15 wherein said flow preventing means includes means for circulating atmosphere at a high rate, relative to the rate at which atmosphere is supplied to said several zones, in a direction which has substantially no component longitudinal of said furnace from a first boundary to an opposed boundary of each of said carburizing and diffusing zones, and from each opposed boundary, exteriorly of said zone, back to the respective first boundary.

17. Apparatus for continuously carburizing ferrous metal work comprising: a furnace including longitudinally extending and aligned heating, carburizing, and diffusing zones, means for conveying work successively through said zones, means for heating work within said zones, means for introducing into said heating zone a carrier gas incapable of appreciable carburization of the work, means for introducing into said diffusing zone a mixture of a carrier gas and an enriching gas in proportions to provide a carbon potential [between 0.6 to 1.4 percent in said diffusing zone] *in said diffusing zone lower than that of said carburizing zone,* means for withdrawing atmosphere from said carburizing zone to induce a flow of atmosphere thereto from said heating and diffusing zones, means for mixing with the atmosphere in said carburizing zone an enriching gas in a proportion to provide a carbon potential between 0.6 and [1.1] *1.4* percent therein, and means for preventing appreciable flow of atmosphere from said carburizing zone to either of said heating and diffusing zones.

18. The apparatus of claim 17 wherein said flow preventing means includes means for circulating atmosphere at a high rate, relative to the rate at which atmosphere is supplied to said several zones, in a direction which has substantially no component longitudinal of said furnace from a first bundary to an opposed boundary of each of said carburizing and diffusing zones, and from each opposed boundary, exteriorly of said zone, back to the respective first boundary.

*19. In a continuous method for carburizing ferrous metal work in a furnace apparatus having longitudinally aligned heating, carburizing, and diffusing zones which includes the steps of introducing a carrier gas, incapable of appreciable carburization, into said heating zone, introducing a carburizing gas into said carburizing zone, which carburizing gas is enriched sufficiently to produce a carbon potential of between 0.6 and 1.4 percent in said carburizing zone and which is introduced at a rate sufficient to maintain said carbon potential, introducing a gas into said diffusing zone to produce a lower carbon potential in said diffusing zone and which is introduced at a rate sufficient to maintain said lower carbon potential, causing an outflow of atmosphere from one of said carburizing and diffusing zones at a rate sufficient to prevent an appreciable flow of atmosphere from said carburizing zone to said heating zone, passing said work successively through said aligned zones, and heating said work to a temperature within the austenitic range of said work, in said heating zone.*

*20. The method as claimed in claim 19 further including the step of separately recirculating the atmospheres in each of the carburizing and diffusing zones at a rate of at least 50 times the rate of the atmosphere entering the furnace.*

*21. In a continuous method for carburizing ferrous metal work in a furnace apparatus having longitudinally aligned heating, carburizing, and diffusing zones which includes the steps of introducing a carrier gas, incapable of appreciable carburization, into said heating zone, introducing a carburizing gas into said carburizing zone, which carburizing gas is enriched sufficiently to produce a carbon potential of between 0.6 and 1.4 percent in said carburizing zone and which is introduced at a rate sufficient to maintain said carbon potential, introducing a*

*gas into said diffusing zone to produce a lower carbon potential in said diffusing zone and which is introduced at a rate sufficient to maintain said lower carbon potential, causing an outflow of atmosphere from one of said carburizing and diffusing zones at a rate sufficient to prevent an appreciable flow of atmosphere from said carburizing zone to said diffusing zone, passing said work successively through said aligned zones, and heating said work to a temperature within the austenitic range of said work in said heating zone.*

*22. The method as claimed in claim 21 further including the step of separately recirculating the atmospheres in each of the carburizing and diffusing zones at a rate of at least 50 times the rate of the atmosphere entering the furnace.*

*23. In a continuous method for carburizing ferrous metal work in a furnace apparatus having longitudinally aligned heating, carburizing, and diffusing zones which includes the steps of introducing a carrier gas, incapable of appreciable carburization, into said heating zone, introducing a carburizing gas into said carburizing zone, which carburizing gas is enriched sufficiently to produce a carbon potential of between 0.6 and 1.4 percent in said carburizing zone and which is introduced at a rate sufficient to maintain said carbon potential, introducing a gas into said diffusing zone to produce a lower carbon potential in said diffusing zone and which is introduced at a rate*

*sufficient to maintain said lower carbon potential, causing an outflow of atmosphere from one of said carburizing and diffusing zones at a rate sufficient to prevent an appreciable flow of atmosphere from said carburizing zone to said heating and diffusing zones, passing said work successively through said aligned zones, and heating said work, in said heating zone, to a temperature within the austenitic range of said work.*

*24. The method as claimed in claim 23 further including the step of separately recirculating the atmospheres in each of the carburizing and diffusing zones at a rate of at least 50 times the rate of the atmosphere entering the furnace.*

References Cited

The following references, cited by the Examiner, are of record in the patented file of this patent or the original patent.

UNITED STATES PATENTS

| | | | |
|---|---|---|---|
| 2,955,062 | 10/1960 | Cullen et al. | 148—16.5 |
| 3,218,323 | 4/1964 | Davis | 148—16.5 X |
| 3,189,336 | 6/1965 | Montagino | 148—16.5 X |

CHARLES N. LOVELL, Primary Examiner

U.S. Cl. X.R.

263—36; 266—3

UNITED STATES PATENT OFFICE
CERTIFICATE OF CORRECTION

Reissue No. 26,935 August 18, 1970

Orville E. Cullen

It is certified that error appears in the above identified patent and that said Letters Patent are hereby corrected as shown below:

Column 1, line 30, "an", first occurrence, should read -- and --; line 44, "separtae" should read -- separate --; line 63, "a", first occurrence, should read -- at --. Column 3, line 25, "oridizing" should read -- oxidizing --. Column 5, line 34, "pasageway" should read -- passageway --; line 58, "suitably" should read -- suitable --. Column 6, line 72, "atmoshperes" should read -- atmospheres --. Column 7, line 64, "withdraw" should read -- withdrawn --; line 71, "in" should read -- is --. Column 9, line 39, "an" should read -- and --. Column 11, lines 73 to 74, "between 0.6 and 1.1 percent therein" should read -- in said diffusing zone lower than that of said carburizing zone --. Column 12, line 37, "bundary" should read -- boundary --.

Signed and sealed this 16th day of March 1971.

(SEAL)
Attest:

EDWARD M.FLETCHER,JR.
Attesting Officer

WILLIAM E. SCHUYLER, JR.
Commissioner of Patents